United States Patent
Mena et al.

(10) Patent No.: US 9,146,250 B2
(45) Date of Patent: Sep. 29, 2015

(54) METHODS AND SYSTEMS FOR DISPLAYING BACKUP AIRSPEED OF AN AIRCRAFT

(71) Applicant: Gulfstream Aerospace Corporation, Savannah, GA (US)

(72) Inventors: Mike Mena, Savannah, GA (US); Simon Colmenares, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 114 days.

(21) Appl. No.: 13/949,004

(22) Filed: Jul. 23, 2013

(65) Prior Publication Data

US 2015/0029046 A1  Jan. 29, 2015

(51) Int. Cl.
*G01P 1/10* (2006.01)
*G01P 1/08* (2006.01)

(52) U.S. Cl.
CPC ........................................ *G01P 1/10* (2013.01)

(58) Field of Classification Search
CPC ............... G01P 5/00; G01P 1/08; G01P 1/10; G01S 17/58; G01C 23/00; G08G 5/0021
USPC ........ 340/963, 969, 973, 978; 701/3, 14, 213, 701/214; 342/356.12, 357.06
See application file for complete search history.

(56) References Cited

U.S. PATENT DOCUMENTS

| | | | |
|---|---|---|---|
| 6,345,232 B1 | 2/2002 | Lynch et al. | |
| 7,215,256 B2* | 5/2007 | Reusser et al. | 340/975 |
| 8,095,251 B2* | 1/2012 | Preaux | 701/7 |
| 8,493,412 B2* | 7/2013 | Suddreth et al. | 345/633 |
| 2003/0132860 A1* | 7/2003 | Feyereisen et al. | 340/973 |
| 2010/0131230 A1 | 5/2010 | Perrie et al. | |
| 2012/0001774 A1 | 1/2012 | Lyons et al. | |
| 2013/0066488 A1* | 3/2013 | Walter | 701/14 |

OTHER PUBLICATIONS

United States International Searching Authority, International Search Report and Written Opinion for International Application No. PCT/US2014/046599, mailed Nov. 4, 2014.

* cited by examiner

*Primary Examiner* — Hung T Nguyen
(74) *Attorney, Agent, or Firm* — Ingrassia, Fisher & Lorenz, P.C.

(57) ABSTRACT

The disclosed embodiments relate to an aircraft that includes system for selecting an airspeed reference that is displayed within a cockpit of an aircraft. The system includes a processor and a display located in the cockpit. The processor is configured to determine whether primary airspeed is valid or invalid, and, to select a backup airspeed as the airspeed reference that is output to the display when it is determined that the primary airspeed is invalid. The display is configured to display the backup airspeed as the airspeed reference. The backup airspeed is generated based on Global Position System (GPS) information that is received by the aircraft.

15 Claims, 5 Drawing Sheets

METHODS AND SYSTEMS FOR DISPLAYING BACKUP AIRSPEED OF AN AIRCRAFT

TECHNICAL FIELD

The present invention generally relates to aircraft, and more particularly relates to methods and systems for displaying backup airspeed of an aircraft.

BACKGROUND

When an aircraft is in flight, availability of airspeed data is critical and therefore it is necessary to have systems that can be used to measure and/or provide an indication of airspeed of the aircraft. To measure airspeed data that is needed to determine airspeed, many aircraft employ a pitot-static system.

A pitot-static system generally has a pitot tube, a static port, and pitot-static instruments. The pitot-static system is used to obtain pressures for interpretation by the pitot-static instruments. For example, this equipment measures the forces acting on a vehicle as a function of the temperature, density, pressure, and viscosity of the fluid in which it is operating. For instance, an airspeed indicator (ASI) is connected to both the pitot tube and static port. The difference between the pitot pressure and the static pressure is called "impact pressure." The greater the impact pressure, the higher the indicated airspeed (IAS) is that will be reported.

Other instruments that might be connected can include air data computers, flight control computers, autopilot systems, flight data recorders, altitude recorders, cabin pressurization controllers, and various airspeed switches. For example, many modern aircraft use an air data computer (ADC) to calculate airspeed, rate of climb, altitude, and Mach number. In some aircraft, two ADCs receive total and static pressure from independent pitot tubes and static ports, and the aircraft's flight data computer compares the information from both computers and checks one against the other.

Failure of Pitot-Static Measurement Equipment

Although pitot-static equipment is normally reliable, in some situations pitot-static systems and apparatus can fail. Information obtained from the pitot static system, such as airspeed or altitude, is often critical to a successful and safe flight. As such, errors in pitot-static system readings (or the absence thereof) can be extremely dangerous.

For example, one type of pitot-static system malfunction occurs when a pitot tube is blocked or clogged for some reason, but the static port remains clear. A blocked pitot tube will cause the airspeed indicator to register a faulty or incorrect airspeed. In some cases, this can result in a reading of zero airspeed.

Another type of pitot-static system malfunction occurs when a static port is blocked. A blocked static port is a more serious situation because it affects all pitot-static instruments. One of the most common causes of a blocked static port is airframe icing. A blocked static port will cause the altimeter to freeze at a constant value, the altitude at which the static port became blocked. The vertical speed indicator will freeze at zero and will not change at all, even if vertical airspeed increases or decreases. The airspeed indicator will reverse the error that occurs with a clogged pitot tube and result in an airspeed that is less than it is actually is as the aircraft climbs. When the aircraft is descending, the airspeed will be over-reported. In most aircraft with unpressurized cabins, an alternative static source is available and toggled from within the cockpit of the airplane.

Inherent errors can affect different pitot-static equipment. For example, density errors affect instruments metering airspeed and altitude. This type of error is caused by variations of pressure and temperature in the atmosphere. Therefore, modern pitot-static systems will automatically correct for temperature and pressure variances from standard atmospheric conditions to ensure accurate airspeed data is presented.

Need for Backup Airspeed Measurement Sources

Many modern aircraft implement redundant pitot-static airspeed measurement equipment that can serve as a backup when the primary pitot-static measurement equipment experiences a fault condition or fails. For example, many large transport category aircraft include three very similar or identical pitot-static systems for redundancy.

While the FAA permits this configuration, one drawback of this approach is that the two redundant pitot-static airspeed measurement systems are susceptible to failing for the same reasons that caused the primary pitot-static measurement system to fault or fail. For instance, all three pitot-static measurement systems can fall prey to a common mode failure (e.g., blockage failure due to contamination by ice, volcano ash, bird strikes and/or pitot heater failure, etc.) and experience a fault or failure at the same time. Unfortunately, in such systems, no other backup airspeed measurement system is available.

There is a need for improved backup/redundant systems and apparatus that can be used to provide airspeed measurements during flight of an aircraft in the event that the pitot-static airspeed measurement equipment experiences a fault or fails.

It would be desirable to provide a backup airspeed measurement source for use in emergencies (e.g., when a partial or complete failure of the primary airspeed measurement occurs). It would also be desirable if such backup airspeed measurement sources are not susceptible to the same modes of failure as the primary and secondary pitot-static system(s). Other desirable features and characteristics of the present invention will become apparent from the subsequent detailed description and the appended claims, taken in conjunction with the accompanying drawings and the foregoing technical field and background.

BRIEF SUMMARY

In one embodiment, a method is provided for selecting an airspeed reference that is displayed on a display in a cockpit of an aircraft. The method comprises: determining whether primary airspeed is invalid at a processor, and when it is determined that the primary airspeed is invalid: selecting, at the processor, a backup airspeed as the airspeed reference that is output to the display, and displaying, at the display, the backup airspeed as the airspeed reference. The backup airspeed is generated based on Global Position System (GPS) information that is received by the aircraft.

In another embodiment, a system is provided for selecting an airspeed reference that is displayed within a cockpit of an aircraft. The system comprises: a processor and a display. The processor is configured to determine whether primary airspeed is valid or invalid, and, to select a backup airspeed as the airspeed reference that is output to the display when it is determined that the primary airspeed is invalid. The display is configured to display the backup airspeed as the airspeed reference. The backup airspeed is generated based on Global Position System (GPS) information that is received by the aircraft.

In another embodiment, an aircraft is provided including a cockpit, at least one display located in the cockpit, and a processor. The processor is configured to determine whether primary airspeed is valid or invalid, and to select a backup airspeed as an airspeed reference that is output to the display when it is determined that the primary airspeed is invalid. The display is configured to display the backup airspeed as the airspeed reference. The backup airspeed is generated based on Global Position System (GPS) information that is received by the aircraft.

BRIEF DESCRIPTION OF THE DRAWINGS

The present invention will hereinafter be described in conjunction with the following drawing figures, wherein like numerals denote like elements.

DETAILED DESCRIPTION

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention, which is defined by the claims. Furthermore, there is no intention to be bound by any theory presented in the preceding background or the following detailed description.

Figure 1:
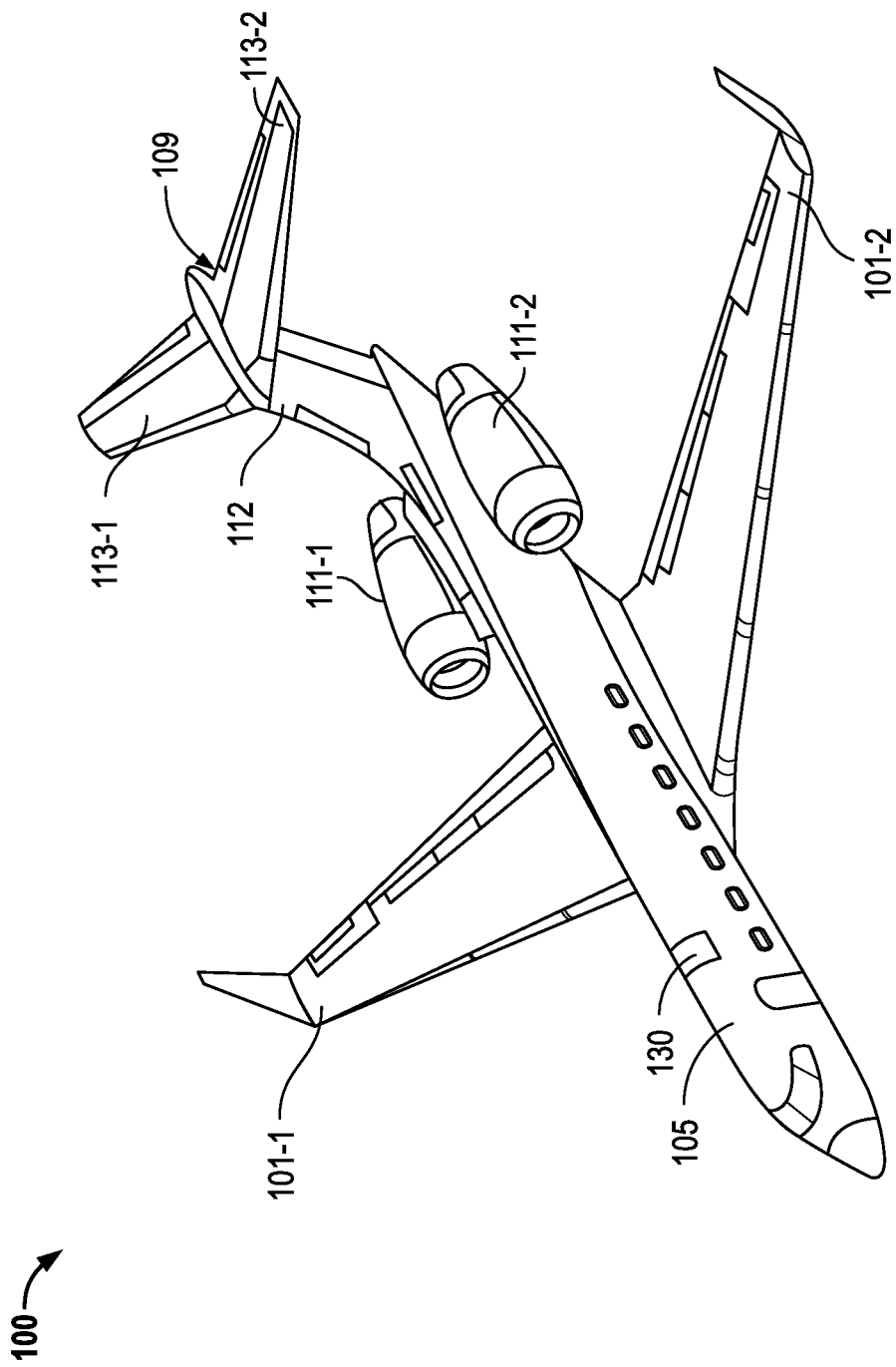
FIG. 1 is a perspective view of an aircraft that can be used in accordance with one non-limiting implementation of the disclosed embodiments.

FIG. 1 is a perspective view of an aircraft 100 that can be used in accordance with one non-limiting implementation of the disclosed embodiments. The aircraft 100 includes two main wings 101-1, 101-2, a fuselage 105, two jet engines 111-1, 111-2, a vertical stabilizer 112, and an elevator 109 that includes two horizontal stabilizers 113-1 and 113-2 in a T-tail stabilizer configuration. The aircraft 100 also includes, among other things, a Global Position System (GPS) module 130 that includes a GPS receiver-processor module as will be described below with reference to FIG. 2.

Figure 2:
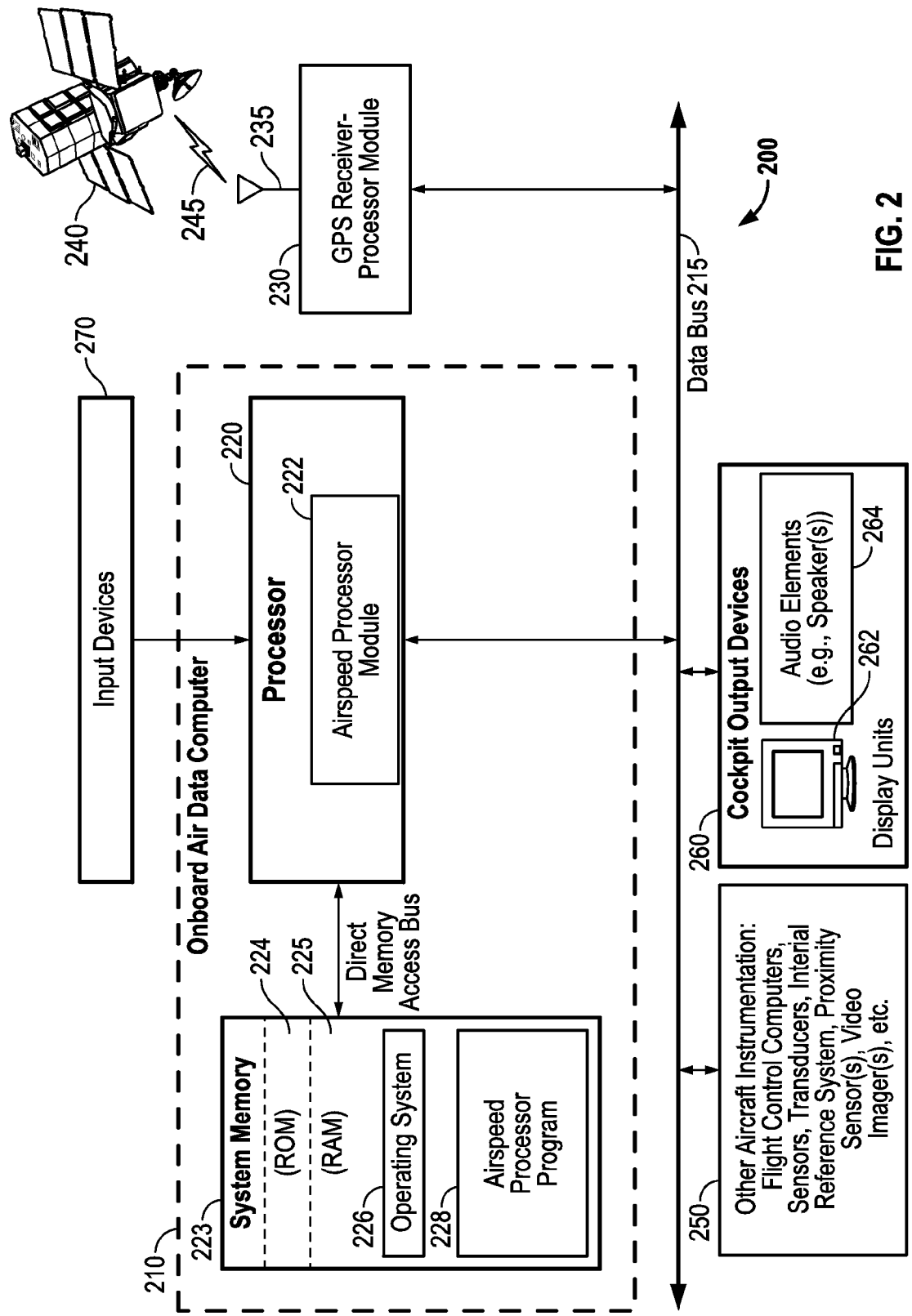
FIG. 2 is a block diagram of a system implemented within an aircraft for selecting airspeed to be used at the aircraft and for displaying the selected airspeed in accordance with an exemplary implementation of the disclosed embodiments.

FIG. 2 is a block diagram of a system 200 implemented within an aircraft 100 for selecting airspeed to be used at the aircraft and displaying the selected airspeed in accordance with an exemplary implementation of the disclosed embodiments. As will be explained below, the airspeed that is selected to be used and displayed can be either a primary airspeed or a backup airspeed when the primary airspeed is invalid (e.g., unavailable or unreliable). As will be explained below, the backup airspeed is derived from GPS information that is received by the aircraft.

The system 200 includes an onboard air data computer (ADC) system 210, a data bus 215, a Global Position System (GPS) receiver-processor module 230, a GPS antenna 235 that is communicatively coupled to external GPS satellites 240 over satellite radio frequency communication links 245, other aircraft instrumentation 250, cockpit output devices 260 (e.g., display units 262 such as control display units, multi-function displays (MFDs), etc., audio elements 264, such as speakers, etc.), and input devices 270 (e.g., including pitot, static and temperature probes).

The onboard air data computer (ADC) system 210 includes a processor 220, and system memory 223. It is noted that although the system memory 223 and the processor 220 are illustrated as two blocks for purposes of illustration, in some implementations, the system memory 223 and the processor 220 may be distributed across several different on-board computers that illustrated collectively as blocks of the on-board ADC system 210.

The data bus 215 serves to transmit data, status and other digital information between the various elements of FIG. 2. For example, the data bus 215 is used to carry information communicated between the processor 220, the GPS receiver-processor module 230, aircraft instrumentation 250, and cockpit output devices 260. The data bus 215 can be implemented using any suitable physical or logical means of connecting the onboard ADC system 210 to at least the external elements mentioned above. This includes, but is not limited to, direct hard-wired connections, fiber optics, and infrared and wireless bus technologies.

The processor 220 performs the computation and control functions of the onboard ADC system 210, and may comprise any type of processor 220 or multiple processors 220, single integrated circuits such as a microprocessor, or any suitable number of integrated circuit devices and/or circuit boards working in cooperation to accomplish the functions of a processing unit.

It should be understood that the system memory 223 may be a single type of memory component, or it may be composed of many different types of memory components. The system memory 223 can include non-volatile memory (such as ROM 224, flash memory, etc.), memory (such as RAM 225), or some combination of the two. The RAM 225 can be any type of suitable random access memory including the various types of dynamic random access memory (DRAM) such as SDRAM, the various types of static RAM (SRAM). The RAM 225 includes an operating system 226, and programs (e.g., computer processor-executable code or instructions) including an airspeed processor program 228.

The other aircraft instrumentation 250 can include, for example, flight control computers, sensors, transducers, autopilots, elements of an Inertial Reference System (IRS), proximity sensors, switches, relays, video imagers, etc. In general, the IRS is a self-contained navigation system. The IRS can include inertial detectors, such as accelerometers, and rotation sensors (e.g., gyroscopes) to automatically and continuously calculate the aircraft's position, orientation, heading (direction) and velocity (speed of movement) without the need for external references once the IRS has been initialized.

The Air Data Computer (ADC) system 210 can process inputs supplied from pitot-static system components, such as those described above, to generate a signal that indicates a primary airspeed and altitude of the aircraft. When the primary airspeed signal is valid, the primary airspeed can be displayed on displays 262 within the cockpit, and provided to various other avionics systems and their processors (e.g., a flight controls system (FCS) processor, an autopilot system processor, a flight management system (FMS) processor, an auto-throttle system processor, traffic alerting system (TCAS), warning systems, flight data recorders (FDR), among others, and used by those avionics systems to perform their various functions. As used herein, the term "primary airspeed" refers to airspeed of an aircraft that is determined by an air data system (ADS) based on information obtained or derived from pitot-static system sensors, temperature probes and barometric correction input devices. Examples of primary airspeed include indicated airspeed (IAS) and calibrated airspeed (CAS), where CAS is the IAS with corrections for errors, such as instrument and installation errors. In one embodiment, the primary airspeed is an indicated airspeed (IAS) that is read directly from an airspeed indicator on an aircraft that is driven by the pitot-static system. In aircraft that operate below transonic or supersonic speeds, IAS is typically displayed as the pilot's primary airspeed reference. IAS uses the difference between total pressure and static pressure, provided by the pitot-static system, to either mechanically or electronically measure dynamic pressure. The dynamic pressure includes terms for both density and airspeed. Since the airspeed indicator cannot know density, it is by design calibrated to assume the sea level standard atmospheric density when calculating airspeed. It is noted that IAS can vary considerably from true airspeed (TAS), which is the relative velocity between the aircraft and the surrounding air mass.

The GPS receiver-processor module 230 is operatively and communicatively coupled to a GPS antenna 235 that can be external to the on-board ADC system 210. The GPS receiver-processor module 230 and GPS antenna 235 can be used to receive information from GPS satellites 240 over satellite radio frequency links 245. The GPS receiver-processor module 230 can then use the GPS information to determine (e.g., compute or derive) a backup airspeed (or aircraft speed).

As noted above, the RAM 225 stores computer processor-executable code or instructions of the airspeed processor program 228. When the airspeed processor program 228 is loaded from system memory 223 and executed at processor 220, the processor 220 can execute an airspeed processor module 222 to perform various steps of a method that will be described below with reference to FIG. 3. As will be explained below, the processor 220 executes the airspeed processor program 228 to select and output either a primary airspeed that is provided from an air data computer (ADC) processor, or a backup airspeed of the aircraft 100 that is provided from the GPS receiver-processor module 230.

The GPS receiver-processor module 230 is communicatively coupled to at least one GPS antenna 235. The GPS receiver-processor module 230 includes at least one GPS receiver and at least one GPS processor along with other elements of a GPS chipset that are not illustrated. The GPS receiver-processor module 230 is illustrated as a single block in FIG. 2, but can be implemented as separate microchips at block 230. The GPS receiver-processor module 230 can be used to receive GPS signals from GPS satellites 240 over radio frequency link 245. The GPS signals can include a variety of GPS information.

As will be described below, the GPS information can be processed at the GPS receiver-processor module 230 to determine an indication of airspeed of the aircraft that is referred to herein a "backup airspeed" since it can be used by the aircraft in the event a primary airspeed of the aircraft becomes invalid (e.g., unreliable or unavailable). In some cases, the primary airspeed can be determined to be invalid when the primary airspeed is determined to be unavailable. For example, primary airspeed can be determined to be unavailable when the air data computer system 220 losses electrical power, a processor of the air data computer system 210 or the data bus 215 fails, etc. In other cases, the primary airspeed can be determined to be invalid when the primary airspeed is determined to be unreliable. For example, the primary airspeed can be determined to be unreliable when components of the pitot static system fail or do not operate correctly. Examples of such situations would include clogging or icing of pitot and/or static probes or sensors, electrical faults (e.g., open or short circuits), physical damage to the pitot and/or static probes or sensors or pneumatic lines, loss of electrical power, etc. Further details that describe backup airspeed will be described below.

The primary airspeed is determined to be valid when systems are operating normally (e.g., monitors and warning systems do not indicate an ADS failure or degraded system status). For example, parameters that contain the airspeed values will include status flags that convey the health of the data (valid, invalid, etc.) to other user systems that can be used to determine when the primary airspeed is valid or invalid. When the primary airspeed is determined to be valid, the airspeed processor module 222 can then select and output the primary airspeed to at least one of the cockpit output devices 260, and can also provide the primary airspeed to other avionics systems, sub-systems or processors.

In accordance with the disclosed embodiments, the GPS signals can include a variety of GPS information including positional data that indicates position of the aircraft, and other information that can be processed by the GPS receiver-processor module 230 to determine or compute an indication of airspeed of the aircraft that is referred to herein a "backup airspeed." When the airspeed processor module 222 determines that the primary airspeed is invalid (e.g., unavailable or unreliable), the airspeed processor module 222 can then select and output a backup airspeed to at least one of the cockpit output devices 260, and can also provide the primary airspeed to other avionics systems, sub-systems or processors. This way, the backup airspeed can be displayed within the aircraft and used by the aircraft's avionics systems in the event a primary airspeed (e.g., indicated airspeed (IAS)) of the aircraft becomes invalid (e.g., unreliable or unavailable).

As used herein, the term "backup airspeed" refers to airspeed of an aircraft that provided from a GPS receiver-processor module that is located on-board the aircraft. The GPS receiver-processor module is typically part of a GPS microprocessor chipset that also includes a GPS processor and a GPS receiver. The GPS receiver can simultaneously monitor a number of channels and receives GPS data from a number of GPS satellites (e.g., between four and twenty GPS satellites). The GPS receiver can receive GPS data from each GPS satellite over one of the channels, and can then provide this GPS data to the GPS processor. Based on the GPS data provided from each of the satellites, the GPS processor can then compute, derive or determine backup airspeed. This GPS data can include GPS positional and/or speed data and/or data that can be processed to compute or derive backup airspeed of the aircraft. Depending on the implementation, the backup airspeed can be determined in a number of different ways.

Backup Airspeed Computation Based on Position Tracking

In some embodiments, a GPS receiver-processor module can receive GPS signal(s) from one or more GPS satellites. Each GPS signal includes GPS positional data along with corresponding time stamps that indicate when that GPS positional data was measured. The GPS receiver-processor module can then use GPS positional data and time stamp information to compute backup airspeed based on distance traveled over a particular time. For example, the GPS receiver-processor module can compute backup airspeed indirectly based on positional data differences and their corresponding time differences (as indicated between successive time stamps).

Backup Airspeed Computation Based on Doppler Frequency Shift

In some embodiments, the GPS receiver-processor module includes a digital phase-locked loop (PLL) that can be used to continuously track carrier frequencies of a number of satellites. Due to relative motion between a GPS satellite and a GPS receiver-processor module, the nominal GPS carrier frequency of the GPS satellite will appear to be "offset" or shifted in frequency (i.e., Doppler shifted) from the frequency of GPS signals received at the GPS receiver-processor module. A Doppler frequency shift refers to a "frequency offset" or difference between a known/nominal GPS satellite carrier frequency (e.g., the L1 carrier frequency of the GPS satellites) and corresponding carrier frequencies of the GPS signals that are received at the GPS receiver-processor module. This Doppler frequency shift is directly proportional to velocity of the GPS receiver-processor module along the direction to the satellite regardless of the distance to this satellite. This can also be referred to as Doppler velocity or instantaneous Doppler-speed since it is the velocity component along a line of sight of the GPS receiver-processor module relative to the satellite. Because Doppler-speed is determined directly from the Doppler-shift of the GPS satellite carrier frequencies, it is completely independent from the positional computations.

Thus, based on the Doppler frequency shift, the GPS receiver-processor module can compute speed of the GPS receiver-processor module that can then be used as a backup airspeed. When the Doppler frequency shifts of signals received from multiple GPS satellites are tracked, the computed "backup airspeed" becomes even more accurate. For example, the GPS receiver-processor module can receive GPS signals from each of a plurality of different GPS satellites, and the GPS receiver-processor module can measure Doppler frequency shift information associated with each of the GPS signals and then use this Doppler frequency shift information to compute speed of the GPS receiver-processor module. In one embodiment, when the Doppler frequency shifts associated with multiple satellites are tracked, a three-dimensional (3D) velocity vector of the GPS receiver-processor module can be determined and used as a backup airspeed.

Figure 3:
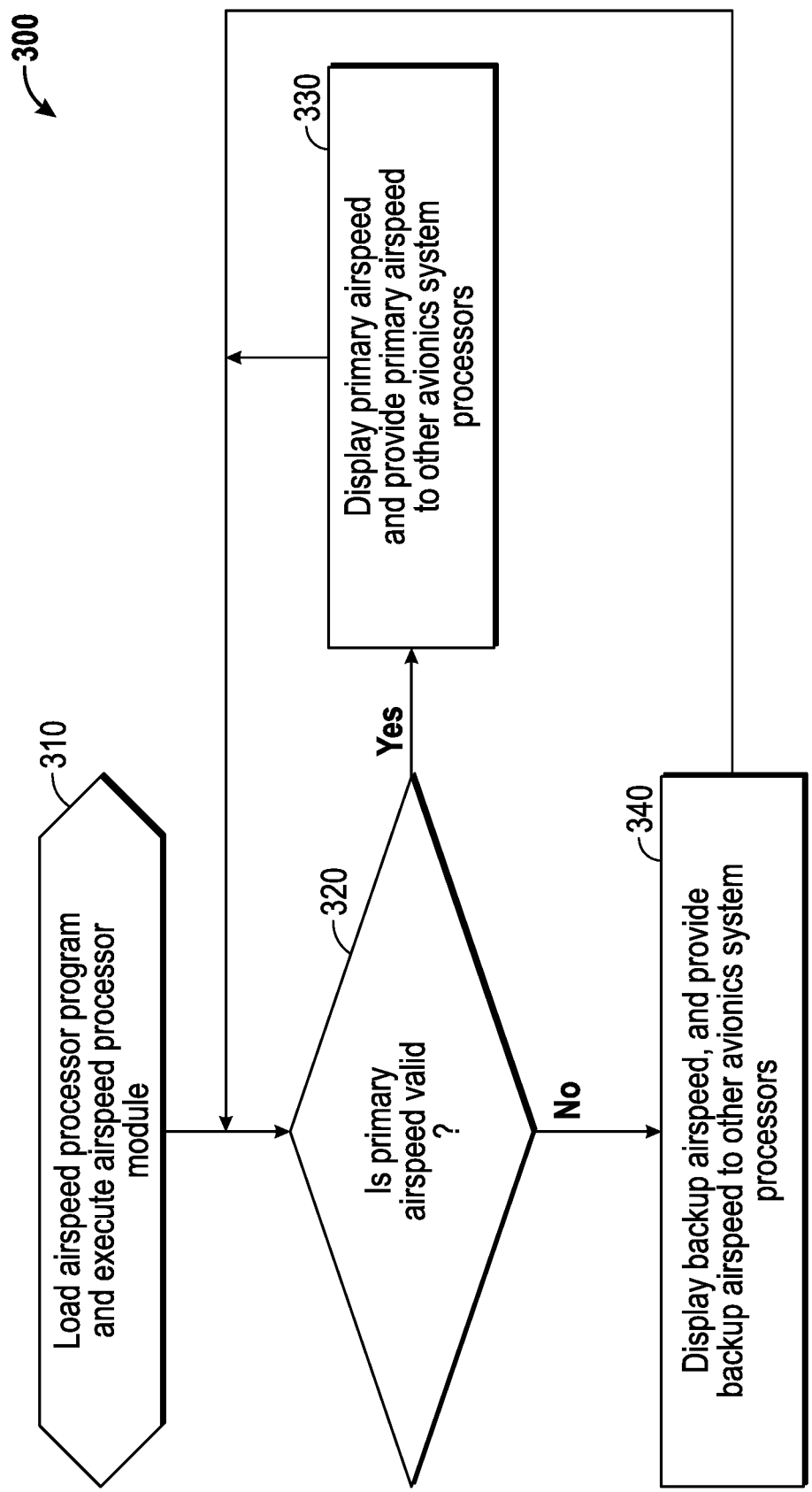
FIG. 3 illustrates a method for selecting an airspeed reference to be used by avionics systems of an aircraft and for displaying the selected airspeed reference on a display in the cockpit of the aircraft.

FIG. 3 illustrates a method 300 for selecting an airspeed reference to be used by avionics systems of an aircraft 100 and for displaying the selected airspeed reference on a display 262 in the cockpit of the aircraft 100. The method 300 of FIG. 3 will be described with reference to FIGS. 1 and 2.

Preliminarily it is noted that the aircraft 100 includes a GPS module 130 that is located on-board the aircraft 100, and, as described above, the GPS module 130 can include a GPS receiver-processor module 230. The GPS receiver-processor module 230 receives GPS signals transmitted from each of a plurality of GPS satellites 240 over radio frequency links. Each GPS signal is modulated at a particular carrier frequency and thus includes carrier frequency information associated with that particular GPS signal. In addition, each GPS signal is encoded with GPS positional data and corresponding time stamps that indicate when that GPS positional data was measured. This GPS information that is includes in each GPS signal can be processed by the GPS receiver-processor module 230 to generate a backup airspeed. For example, in one embodiment, the GPS receiver-processor module 230 can compute the backup airspeed based on the GPS positional data and corresponding time stamps. In another embodiment, the GPS receiver-processor module 230 can compute the backup airspeed by determining a frequency offset for each of the GPS signals, and then computing the backup airspeed based on the frequency offsets. As explained above, the GPS receiver-processor module 230 can determine the frequency offset for each particular one of the GPS signals by determining a difference between the carrier frequency information for that particular one of the GPS signals and a nominal GPS carrier frequency of the GPS satellites that transmitted that particular one of the GPS signals.

Referring again to FIG. 3, method 300 begins at 310 when a processor 220 loads an airspeed processor program 228 and executes it as an airspeed processor module 222. At 320, the airspeed processor module 222 determines whether a primary airspeed is valid or invalid. As explained above, the primary airspeed can be determined to be invalid when the primary airspeed is determined to be unavailable or unreliable for a number of different reasons.

When it is determined (at 320) that the primary airspeed is valid, the method 300 proceeds to 330 where the airspeed processor module 222 selects the primary airspeed as the airspeed reference that is to be output, and outputs the primary airspeed to a display 262 and other output devices 264 in the cockpit of the aircraft 100, as well as to other avionics systems in the aircraft 100. The primary airspeed can then be displayed on or at the display 262 as the airspeed reference, and can be used for various purposes by the other avionics systems in the aircraft 100. In addition, in some implementations, an indication can be provided to indicate that the airspeed reference is the primary airspeed so that the pilot or others in the cockpit have an indication that the airspeed reference is the primary airspeed. As described above, the primary airspeed is an airspeed that is determined by an air data system (ADS) processor based on information supplied from a pitot-static system and temperature probes. As also described above, the pitot-static system includes a pitot tube, a static port, and an airspeed indicator (ASI) connected to the pitot tube and static port. In one embodiment, the primary airspeed is an indicated airspeed (IAS) that is read directly from an airspeed indicator (ASI) of the aircraft 100. The airspeed indicator (ASI) is driven by the pitot-static system. In another embodiment, the primary airspeed is a calibrated airspeed (CAS). The CAS is a version of the IAS that has been adjusted or corrected to compensate for errors. The ASI generates a signal indicative of the primary airspeed, and so long as the primary airspeed is valid, provides the IAS (or alternatively the CAS) to avionics systems in the aircraft 100, as well as one or more aircraft display(s).

By contrast, when it is determined (at 320) that the primary airspeed is invalid, method 300 proceeds to 340 where the airspeed processor module 222 selects a backup airspeed as the airspeed reference that is to be output, and outputs the backup airspeed to a display 262 and other output devices 264 in the cockpit of the aircraft 100, and to other avionics systems in the aircraft 100. The backup airspeed can then be displayed on or at the display 262 as the airspeed reference, and can be used for various purposes by the other avionics systems in the aircraft 100. In addition, in some implementations, an indication can be provided to indicate that the airspeed reference is the backup airspeed so that the pilot or others in the cockpit have an indication that the airspeed reference is the backup airspeed. This indication can be any visual, audible or textual indication that indicates that the airspeed reference has a backup status.

Figure 4:
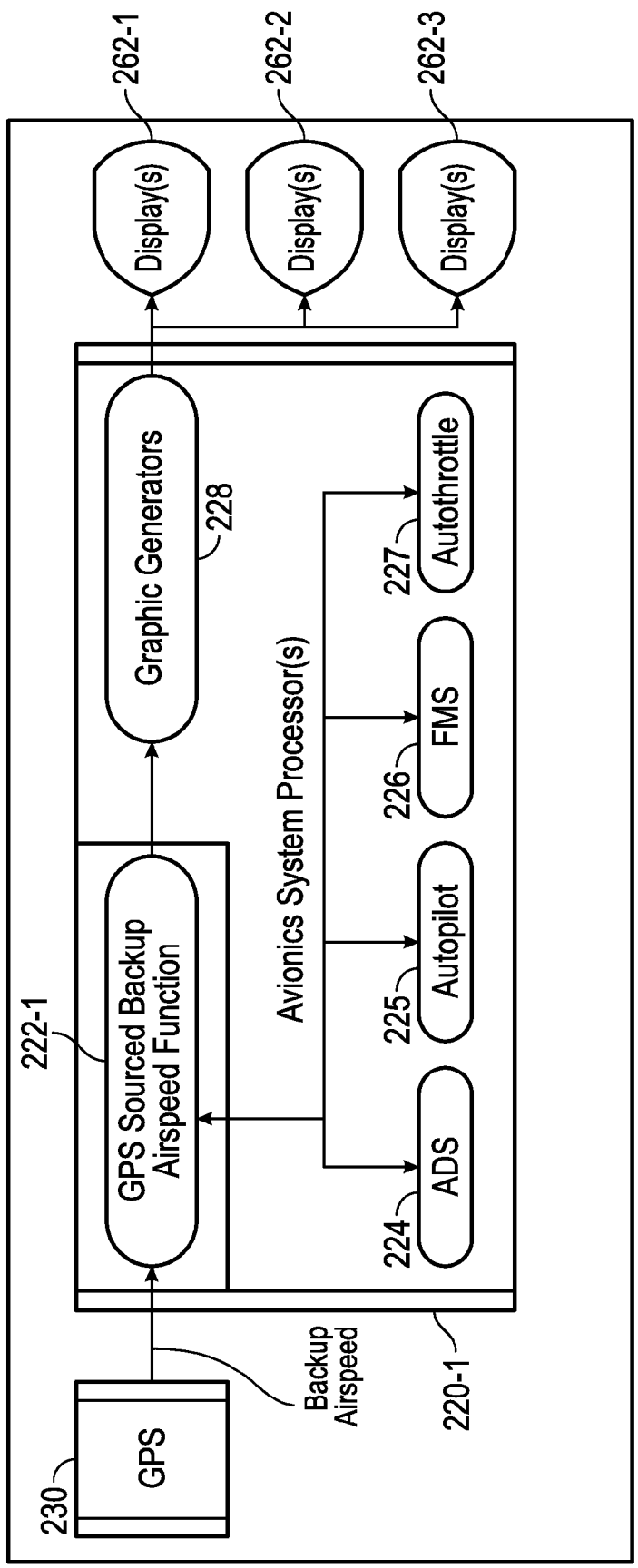
FIG. 4 is a block diagram that illustrates one non-limiting, exemplary implementation of a system for providing backup airspeed as an airspeed reference.

FIG. 4 is a block diagram that illustrates one non-limiting, exemplary implementation of a system for providing backup airspeed as an airspeed reference. The system of FIG. 4 will be described with reference to FIG. 2 to the extent that FIG. 4 uses reference numerals that correspond to FIG. 2.

The GPS receiver-processor module 230 provides a backup airspeed that is derived from GPS information from GPS signals, and is referred to in FIG. 4 as GPS-derived airspeed (GPSDAS).

Backup airspeed function 222-1 represents a portion of computer executable code from the airspeed processor program 228 that is executing at processor 220 as the airspeed processor module 222 when it has been determined (at 320) that a primary airspeed is invalid.

As illustrated in FIG. 4, the backup airspeed function 222-1 outputs backup airspeed to graphics generator module 228 that generates signals that communicate the backup airspeed as an airspeed reference to various displays 262-1, 262-2, 262-3.

In one implementation, display 262-1 can be, for example, a Primary Flight Display (PFD) and can display the backup airspeed in appropriate units to the pilot or others in the cockpit of the aircraft. Display 262-2 can be a Multi-Function Display (MFD) and can display a visual indication (e.g., a warning light or a flashing message) that provides a signal to the pilot that the airspeed reference displayed is a backup airspeed, and not the primary airspeed so that the pilot or others in the cockpit have an alert or are notified that the airspeed reference is the backup airspeed. Display 262-3 can be the equivalent of any of the two above as a redundant display that provides redundant and simultaneous awareness that the airspeed reference displayed is a backup airspeed, and not the primary airspeed so that the pilot or others in the cockpit have another indication that the airspeed reference is the backup airspeed. The various indications provided on displays 262-2, 262-3 provide an alert to the pilot that that the airspeed reference has a backup status.

As is also illustrated in FIG. 4, the backup airspeed function 222-1 outputs the backup airspeed to various avionics system processors 224-227. In this non-limiting example that is illustrated in FIG. 4, the avionics system processors 224-227 include an air data system (ADS) processor 224, an autopilot system processor 225, a flight management system (FMS) processor 226, and an auto-throttle system processor 227; however, it will be appreciated that the backup airspeed can be provided to other avionics system processors that are not illustrated, but that also process airspeed as an input. Although not illustrated in FIG. 4, the backup airspeed function 222-1 can also output the backup airspeed to other output devices 264 in the cockpit of the aircraft 100.

Figure 5:
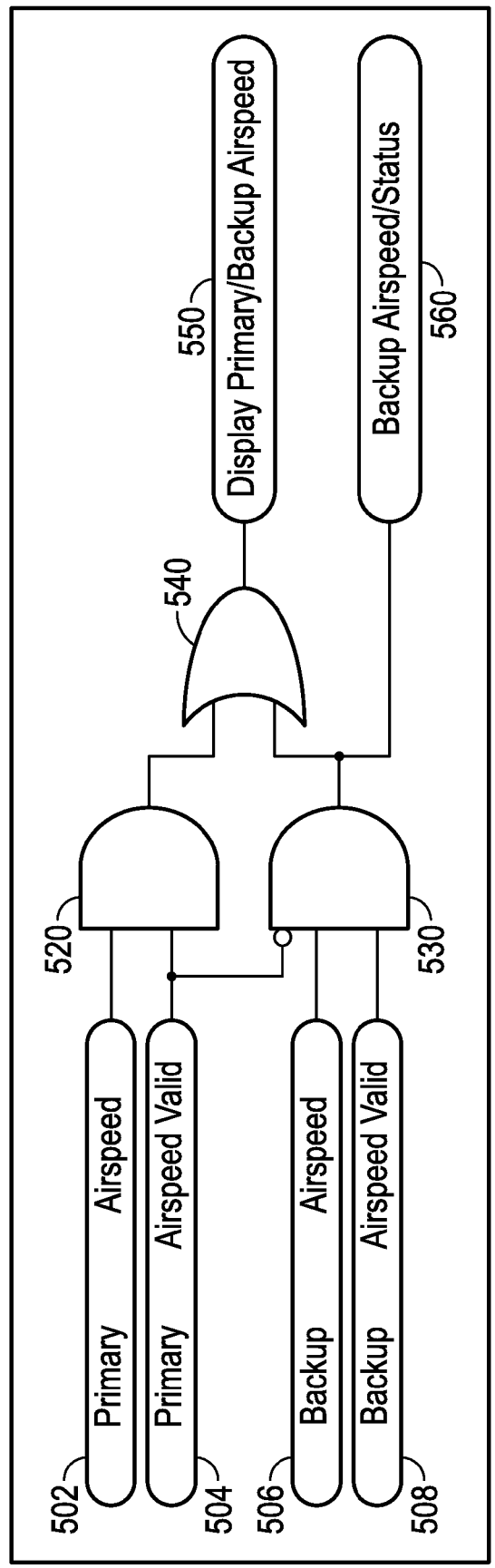
FIG. 5 illustrates a logic diagram of a system for selecting an airspeed reference to be displayed.

FIG. 5 illustrates a logic diagram of a system for selecting an airspeed reference to be displayed. The logic diagram of FIG. 5 will be described with reference to FIGS. 1 and 2. Further it is noted that although the logic that is illustrated via FIG. 5 can be implemented by executing software that comprises processor-executable instructions at a processor, such as by a processor 220 that loads an airspeed processor program 228 and executes it as an airspeed processor module 222, in other implementations, the logic can be executed using semiconductor logic gates that are implemented as a standalone processing unit.

The system includes a two-input AND gate 520, a three-input AND gate 530 and a two-input OR gate 540. This is one exemplary implementation and other equivalent logic schemes can be implemented that provide equivalent logical processing.

In the logic diagram of FIG. 5, four inputs are received. The inputs include a primary airspeed input 502 that indicates the primary airspeed, a first validity input 504 that indicates whether the primary indicated airspeed input 502 is valid, a backup airspeed input 506 that indicates the backup airspeed, and a second validity input 508 that indicates whether the backup airspeed input 506 is valid. As explained above, the primary airspeed 502 can be invalid when the primary airspeed is determined to be unavailable or unreliable for a number of different reasons, but otherwise should be valid. When this happens status flags will be set to indicate that the primary indicated airspeed input 502 is invalid. The backup airspeed input 506 can become invalid, for example, when the system does not receive enough (or any) data from GPS signals from the satellites to compute position and/or speed. When this happens status flags will be set to indicate that the backup airspeed input 506 is invalid.

The two-input AND gate 520 receives the primary airspeed input 502 and the first validity input 504, and performs a logical AND operation on those inputs to generate a first output. The three-input AND gate 530 receives an inverted version of the first validity input 504, the backup airspeed input 506, and the second validity input 508, and performs a logical AND operation on those inputs to generate a second output. The second output is used to control a second display element 560 that indicates whether or not the airspeed reference displayed at the first display element 550 has a primary or backup status.

The two-input OR gate 540 receives the first output and the second output, and generates an airspeed reference output that is displayed at a first display element 550 as an airspeed reference. The airspeed reference output is determined based on the first output or the second output, whichever is active.

For example, when the first validity input 504 indicates that the primary airspeed is valid, then the primary airspeed input 502 will be selected and displayed (as the airspeed reference) at the first display element 550, and the second display element 560 will not be activated. When the first validity input 504 indicates that the primary airspeed is invalid, then the backup airspeed input 506 will be selected and displayed as the airspeed reference at the first display element 550, and the second display element 560 will be activated. As noted above, airspeed reference that is output from two-input OR gate 540 can also be provided to other avionics systems in the aircraft 100, and can be used for various purposes by the other avionics systems in the aircraft 100.

As such, the second display element 560 can be used to indicate whether the airspeed reference is the primary airspeed or the backup airspeed so that those in the cockpit have some indication of whether the airspeed reference is the primary airspeed or a backup airspeed. This way, the pilot or others in the cockpit will have an indication (visual, audible or textual) to notify them when the airspeed reference that is being displayed is the backup airspeed and has a backup status.

One of the benefits of the disclosed embodiments is that they can be used to acquire and provide an indication of backup airspeed when pitot-static measurement devices are unavailable or unreliable. In one implementation, the systems and methods in accordance with the disclosed embodiments can be employed in an aircraft as a secondary or backup airspeed measurement source for use in emergency situations when primary pitot-static airspeed measurement systems experience a partial or complete failure. For example, in the event pitot sensors fail due to blockage or other reasons, the GPS system can be used to provide backup airspeed data. The use of GPS to provide backup airspeed is not subject to the same failure modes that the primary pitot-static airspeed measurement systems are subject to (e.g. a blocked pitot tube or pitot heater failure) since they do not rely on data from pitot-static probes.

Those of skill in the art would further appreciate that the various illustrative logical blocks/tasks/steps, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for selecting an airspeed reference that is displayed within a cockpit of an aircraft, the system comprising:

a Global Position System (GPS) receiver-processor module located on-board the aircraft, the GPS receiver-processor module configured to:

receive GPS signals transmitted from each of a plurality of GPS satellites over radio frequency links, wherein each GPS signal includes GPS information, wherein the GPS information comprises: GPS positional data and corresponding time stamps that indicate when that GPS positional data was measured; and process the GPS information to generate the backup airspeed based on the GPS positional data and corresponding time stamps;

a processor configured to determine whether primary airspeed is valid or invalid, and, to select a backup airspeed as the airspeed reference that is output to the display when the processor determines that the primary airspeed is invalid; and a display that is configured to display the backup airspeed as the airspeed reference.

2. The system according to claim 1, when the processor determines that the primary airspeed is valid, wherein the processor is configured to select the primary airspeed the airspeed reference that is output to the display, and wherein the display is configured to display the primary airspeed as the airspeed reference, wherein the primary airspeed is determined based on information supplied from a pitot-static system configured to generate a signal indicative of the primary airspeed.

3. The system according to claim 1, wherein the primary airspeed is determined to be invalid when the primary airspeed is determined to be unavailable or unreliable.

4. The system according to claim 1, wherein the processor is configured to determine whether all sources of primary airspeed are valid or invalid, and, to select the backup airspeed as the airspeed reference that is output to the display when the processor determines that all sources of the primary airspeed are invalid.

5. The system according to claim 1, when the backup airspeed is displayed at the display as the airspeed reference, wherein the processor is configured to cause an alert signal to be generated in the cockpit that provides an indication to those in the cockpit that the airspeed reference being displayed is the backup airspeed and has a backup status.

6. The system according to claim 1, wherein the backup airspeed is provided to:
   another output device in the cockpit of the aircraft to provide an indication that the airspeed reference is a backup, and
   other avionics systems of the aircraft as the airspeed reference that is to be used by the avionics systems.

7. A system for selecting an airspeed reference that is displayed within a cockpit of an aircraft, the system comprising:
   a Global Position System (GPS) receiver-processor module located on-board the aircraft, the GPS receiver-processor module configured to:
      receive GPS signals transmitted from each of a plurality of GPS satellites over radio frequency links, wherein each GPS signal includes GPS information and carrier frequency information associated with that particular GPS signal;
      determine, for each of the GPS signals, a frequency offset between the carrier frequency information for that particular one of the GPS signals and a nominal GPS carrier frequency of the GPS satellite that transmitted that particular one of the GPS signals; and
      compute the backup airspeed based on the frequency offsets;
   a processor configured to determine whether primary airspeed is valid or invalid, and, to select a backup airspeed as the airspeed reference that is output to the display when the processor determines that the primary airspeed is invalid; and
   a display that is configured to display the backup airspeed as the airspeed reference.

8. The system according to claim 7, wherein the primary airspeed is determined to be invalid when the primary airspeed is determined to be unavailable or unreliable.

9. The system according to claim 7, wherein the processor is configured to determine whether all sources of primary airspeed are valid or invalid, and, to select the backup airspeed as the airspeed reference that is output to the display when the processor determines that all sources of the primary airspeed are invalid.

10. The system according to claim 7, when the backup airspeed is displayed at the display as the airspeed reference, wherein the processor is configured to cause an alert signal to be generated in the cockpit that provides an indication to those in the cockpit that the airspeed reference being displayed is the backup airspeed and has a backup status.

11. An aircraft including a cockpit, the aircraft comprising:
   at least one display located in the cockpit;
   a processor configured to:
      determine whether primary airspeed is valid or invalid, and
      select a backup airspeed as an airspeed reference that is output to the display when the processor determines that the primary airspeed is invalid, wherein the backup airspeed is generated based on Global Position System (GPS) information that is received by the aircraft, and
   wherein the display is configured to display the backup airspeed as the airspeed reference;
   another output device in the cockpit of the aircraft that is configured to provide an indication that the airspeed reference is a backup, and
   other avionics systems that are configured to receive the backup airspeed as the airspeed reference that is to be used by the avionics systems.

12. The aircraft according to claim 11, further comprising:
   a pitot-static system configured to generate a signal indicative of the primary airspeed;
   and wherein the processor is further configured to:
   select, when the processor determines that the primary airspeed is valid, the primary airspeed the airspeed reference that is output to the display, and
   wherein the display is configured to:
   display the primary airspeed as the airspeed reference, wherein the primary airspeed is determined based on information supplied from the pitot-static system.

13. The aircraft according to claim 11, wherein the primary airspeed is determined to be invalid when the primary airspeed is determined to be unavailable or unreliable.

14. The aircraft according to claim 11, wherein the processor is further configured to:
   determine whether all sources of primary airspeed are valid or invalid, and, to select the backup airspeed as the airspeed reference that is output to the display when the processor determines that all sources of the primary airspeed are invalid.

15. The aircraft according to claim 11, wherein the processor is further configured to:
   cause, when the backup airspeed is displayed at the display as the airspeed reference, an alert signal to be generated in the cockpit that provides an indication to those in the cockpit that the airspeed reference being displayed is the backup airspeed and has a backup status.

* * * * *